United States Patent [19]

Tsuchida et al.

[11] 4,296,303
[45] Oct. 20, 1981

[54] METHOD FOR MAKING INTERCELL CONNECTIONS IN MULTI-CELL STORAGE BATTERY

[75] Inventors: Kensaku Tsuchida, Kamakura; Shinji Karasawa, Chigasaki, both of Japan

[73] Assignee: Matsushita Electric Industrial Co., Ltd., Kadoma, Japan

[21] Appl. No.: 60,873

[22] Filed: Jul. 26, 1979

[30] Foreign Application Priority Data

Oct. 6, 1977 [JP] Japan .................................. 52-120576

[51] Int. Cl.³ ............................................. B23K 11/14
[52] U.S. Cl. .............................. 219/78.13; 219/78.16; 219/86.22; 219/119; 219/149
[58] Field of Search ................ 219/78.01, 78.15, 78.16, 219/86.22, 119, 134, 149, 78.13

[56] References Cited

U.S. PATENT DOCUMENTS

| | | | |
|---|---|---|---|
| 2,890,324 | 6/1959 | Havlik | 219/149 |
| 3,313,658 | 4/1967 | Sabatino | 136/134 |
| 3,336,164 | 8/1967 | Miller | 136/134 |
| 3,676,637 | 7/1972 | Anderson | 219/86.22 X |
| 3,767,889 | 10/1973 | Sano | 219/137 |
| 3,854,030 | 12/1974 | Roye | 219/78.16 X |
| 3,908,739 | 9/1975 | Cushman | 219/78.16 X |
| 4,015,098 | 3/1977 | Matter | 219/119 X |
| 4,146,889 | 3/1979 | Tiegel | 219/78.16 |

*Primary Examiner*—Richard R. Kucia
*Attorney, Agent, or Firm*—Cushman, Darby & Cushman

[57] ABSTRACT

In an intercell connection of a multi-cell storage battery of the type having, in each unit cell separated by at least a partition wall of battery cell having an opening for said intercell connection, a pair of upstanding connectors integral with straps electrically conductive to electrode assemblies of one polarity and the other polarity, wherein the one of the connector has a projection formed integral therewith and extending horizontally therefrom passing through said opening, and the other of the connector has an aperture with the axis extending horizontally to be capable of accepting said projection extending through said opening, the intercell connection method is characterized by comprising the steps of positioning such one connector and the other connector of neighboring unit cells on opposite sides of said partition wall so that said projection can pass through the opening into said aperture to form a fit joint inbetween, and causing said fit joint be fused together by supplying said joint with a heat sufficient for welding said projection with said aperture by urging an outside heat-generating element to said joint while pressing said connectors against said partition wall by a pair of pressure applying means from both sides.

14 Claims, 13 Drawing Figures

METHOD FOR MAKING INTERCELL CONNECTIONS IN MULTI-CELL STORAGE BATTERY

BACKGROUND OF THE INVENTION

1. Field of the Invention

The present invention relates to an improvement of making intercell connections in multi-cell storage battery.

2. Prior Art

Several methods for making intercell connections in multi-cell storage battery have been proposed. For example, U.S. Pat. No. 3,313,658 for A. Sabatino et al discloses an art of squeeze welding or butt welding, which makes intercell connection by utilizing Joule heat in the butt welding. Another art is the art of press-caulking disclosed in the U.S. Pat. No. 3,336,164 for J. H. Miller. The important purpose of these conventional art is to secure good electric connections of intercell connections and good sealing of the battery cells.

The former prior art, the U.S. Pat. No. 3,313,658 for Sabatino et al. discloses the art that connectors of neighboring cells of a battery are connected each other by connecting projections of the connectors, penetrating through an opening on the intercell partition wall of the battery by electrical butt-welding, in such a manner that lead fused by Joule heat fills gaps between the aperture and the projection and gaps between the connectors and the partition walls, thereby air tightly sealing the intercell connection parts.

The latter prior art, the U.S. Pat. No. 3,336,164 for Miller discloses the art that a projection of a lead connector is, after passing through an opening of an intercell partition wall, inserted into an opening of another lead connector, and the projection is secured by mechanical fitting to the opening of the another connector thereby making an air-tight sealing and fixing.

The former art of Sabatino has the problem that by means of welding heat, the peripheral part of the opening of the intercell partition wall made of synthetic resin is decomposed, thereby producing gases, which come into the sealing part of connectors and form undesirable blow holes, which causes leakage of electrolyte and poor conductivity of the intercell connection.

In order to remove such problem of the gas produced by decomposing of the resin parts, an improvement to provide a gas discharging opening is proposed in the U.S. Pat. No. 3,687,734 for D. Orlando et al. However, even with such improved construction, it is very difficult to substantially remove the undesirable effect of the decomposition to gas at the opening part of the partition wall.

Furthermore, the butt welding method has another shortcoming that, when the electric contact resistance between the two connectors to be welded to each other is reduced as the welding proceeds, the temperature at the butt-welded part does not rise any more, therefore, an insufficient welding is carried out. Such insufficient welding is difficult to detect by its appearance or tensile test. Such insufficient welding will result in break off defects during its usage after a lapse of time. Furthermore, what makes the matter more difficult is that the insufficient butt-welding can not be cured by the butt-welding method, since no necessary Joule heat is obtainable after once decreasing of the electrical resistance as a result of welding.

The latter method (caulking) of Miller has a problem of possible cracks of the connector due to mechanical strain, and it is a great problem that such cracks can not be detected from outside, and that the battery having such cracks is likely to results in undesirable temperature rise at crack part and further in a melt-off and further in an explosion defect, after receiving repeated shocks in automobile or the like.

A further method have been proposed in the U.S. Pat. No. 3,767,889 for Ichiro Sano et al. The art of Sano et al utilizes an inert-gas shielded welding method or plasma arc welding method utilizing an inert-gas plasma torch. The problem of this method is that a tungsten electrode must be always controlled so as to have a right position irrespective of its continuous comsumption. This control requires a special apparatus in automatic welding machines in automated production lines.

SUMMARY OF THE INVENTION

The present invention purports to provide a novel method of making intercell connections with high reliability and easy control.

The contrivance of the present invention is based on the known concept of establishing a fused contact between components of lead or lead alloy, by means of soldering iron or burner.

With this particular construction of the heat generating element and the manner by which the element is received in one of the pair of the pressure applying means, said fused contact can be made very easily and effectively. Differing from the conventional soldering operation, the present invention utilizes a heating member of a construction and a manner of locating the heating member in a pressure applying means particularly suited for the purpose.

DESCRIPTION OF THE PREFERRED EMBODIMENTS

The gist of the present invention is a method for making intercell connection in a multi-cell storage battery including, in each unit cell separated by at least a partition wall of insulating material having an opening for said intercell connection, a pair of connectors integral with straps electrically conductive to electrode assemblies of one polarity and of the other polarity, wherein the one of the connector has a projection formed integral therewith and extending therefrom passing through said opening, and the other of the connector has an aperture with the axis extending in the longitudinal direction of said projection to accept said projection extending through said opening, the method comprises the steps of:

(a) positioning said one and the other connectors of neighboring unit cells on opposite sides of said partition wall so that said projection passes through the opening into said aperture to form a fit joint inbetween, and (b) causing said fit joint to be fused together by supplying said joint with heat sufficient for welding said projection with said aperture by applying an outside heating member to said joint during pressing said connectors against said partition wall by a pair of pressing member, In the following, the present invention is elucidated referring to figures showing preferred embodiments of the invention.

Figure 1:
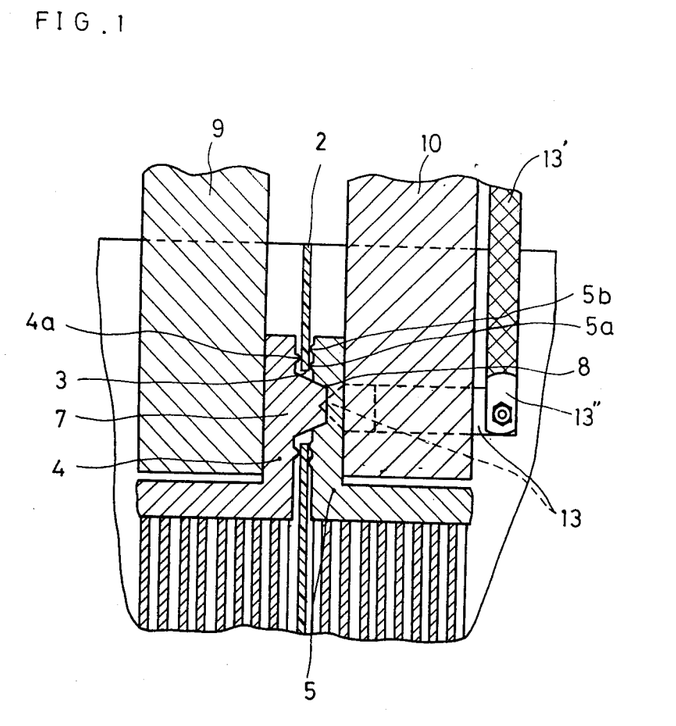
FIG. 1 is a sectional elevation view illustrating the principle of the intercell connection of the present invention.
Figure 2:
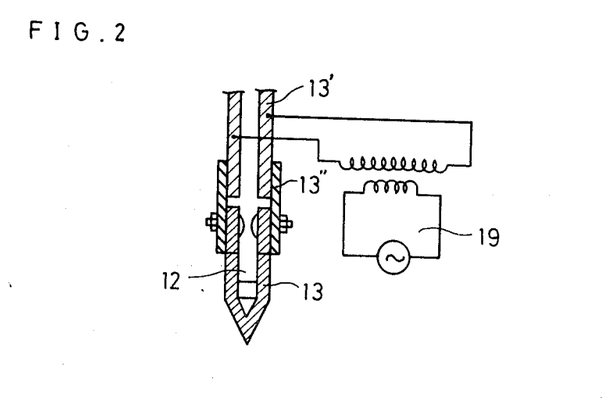
FIG. 2 is a schematic sectional view of a heating member.

First, principle of the present invention is elucidated referring to FIG. 1 and FIG. 2.

The present invention is made by developing a method of heating the intercell connection part by means of pressing a heating member thereto.

Conventional soldering iron is designed for use in soldering with known lead-tin low-temperature solder. However, such conventional soldering iron is not suitable for welding the lead to lead intercell connection in multi-cell storage battery which requires such a high surface temperature of the soldering iron of 400° C. to 800° C. In order to obtain good result in the actual manufacturing line of the intercell connection, a use of a large electric power to heat the soldering iron is preferable. Use of such a large electric power reduces thermal loss in the economical viewpoint and also reduces undesirable oxidation of the iron surface.

FIG. 1 shows an example wherein a projection 7 of a connector 4 passes through an opening 3 of the intercell partition wall 2 of a battery case and is inserted into an aperture 8, a straight hole of constant diameter, of the other connector 5 which is disposed on opposite side of the partition wall 2. And the connecting parts of the connectors are pressed by the top face of a wedge-shaped heating member 13, which is heated by electric current flowing therethrough as shown by FIG. 2, and also, the connectors 4 and 5 are pressed by a pair of pressing members 9 and 10, with the partition wall 2 inbetween. The heating member 13 is connected to a power source 19 by a pair of joint plates 13" and a pair of supporting member 13', and is insulated from the pressing member 10. By means of pressing and heating by the heating member 13, the projection 7 of the lead connector, and hence, the aperture 8 contacting the projection 7 are heated and fused, thereby welding the projection 7 and the aperture 8 together.

Figure 3:
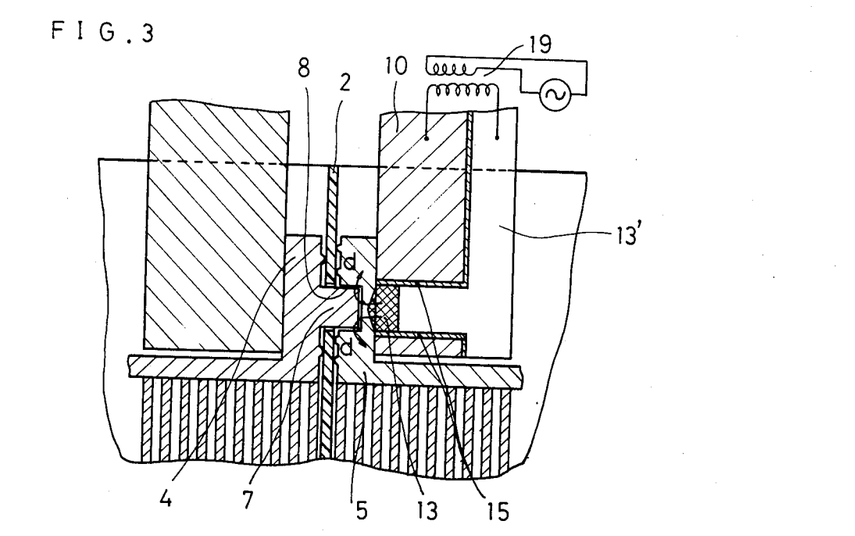
FIG. 3 is a sectional elevation view illustrating a process of an embodiment of the present invention.

FIG. 3 shows an embodiment of the process, wherein the heating current "d" from a power source 19 flows through a supporting member 13', heating member 13, a part of first connector 5, projection 7 of a second connector 4, again the cylindrical face of the aperture 8 of the first connector 5 and a pressing member 10. The heating member 13 is electrically isolated from the pressing member 10 by means of the insulator 15 disposed inbetween, is connected by joint plates 13" to feeders 13'. By means of the current flowing through the heating means 13, the heating member 13 is particularly heated to a temperature of 400° C. to 800° C. Preferable current is 3,000 A to 5,000 A.

Figure 4:
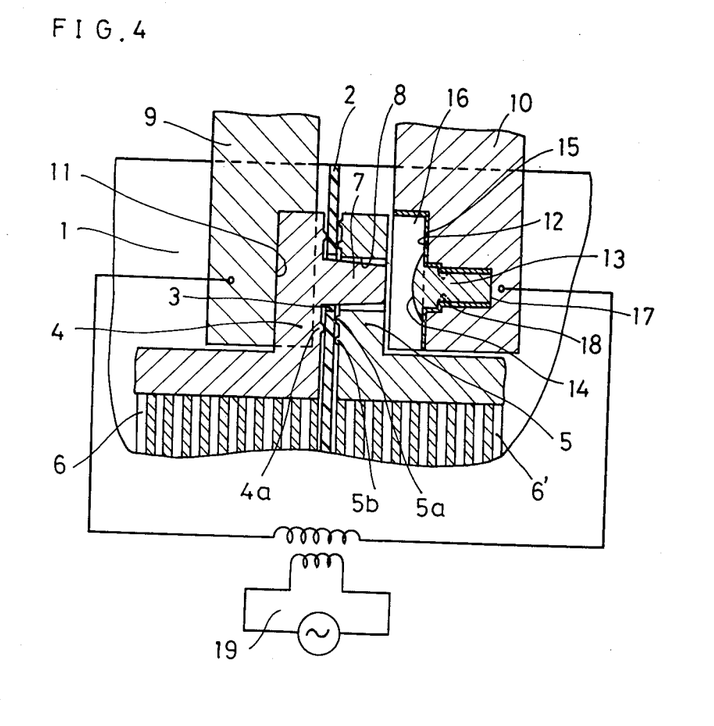
FIG. 4 is a sectional elevation view illustrating a process of another embodiment of the present invention.
Figure 5:
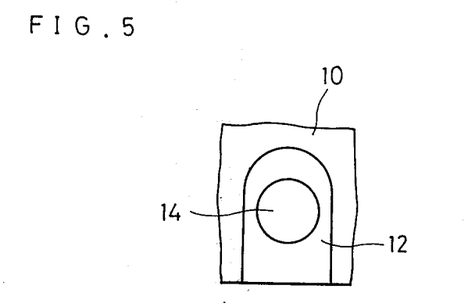
FIG. 5 is a front view of a heating member of the embodiment of FIG. 4.

FIG. 4 shows another embodiment of the process in accordance with the present invention wherein the heating current flows through heating member 13 of a high resistance substance and projection 7. In a known plastic container 1 of a storage battery, on both sides of a known plastic intercell partition wall 2, a first connector 4 and a second connector 5, both made of lead, are disposed. To the connectors 4 and 5, are connected all elements of cells 6 and 6' disposed on both sides of the partition wall 2. The partition wall 2 has an opening 3, i.e., a through-hole, through which a projection 7 of the first connector 4 passes and is inserted into a through-hole aperture 8 of a second connector 5. Diameter of the opening 3 of the partition wall 2 is selected to be larger than that of the projection 7 so that the latter can easily pass through the former. The connectors 4 and 5 have low ring-shaped sealing projections or annular ribs 4a and 5a, 5b, respectively. The annular ribs 4a, 5a and 5b are pressed into the partition wall 2 by means of pressing member 9 and 10 of a suitable metal such as iron when the connectors 4 and 5 are hot, thereby tightly sealing the intercell connection part. The pressing member 9 has a recess 11 for receiving the connector 4 therein, and the other pressing member 10 has a recess 12 for receiving the connector 5 therein. FIG. 5 shows shape in front view of the recess 12. The shape of the recess 11 is substantially same as that of the recess 12. A semispherical heating face 14 of a heating member 13 is disposed in the recess 12 in a manner to face the top face of the projection 7. A known heat resistant insulation layer or coating 16 is provided on the inside face of the recess 12 of the pressing member 10, in a manner electrically to isolate the heating member 13 from the pressing member 10 except at the rear end face which directly contacts the pressing member. The heating member 13 is made of a heating-resistant material having a high electrical resistance, such as titanium, tungsten, graphite, artificial graphite, nickel-chrome alloy, or hastelloy. The properties required for the material of the heating member 13 are a low electric conductivity i.e., a high resistivity compared with lead, a high durability against high mechanical stress as well as a high thermal resistivity. Therefore the material for the heating means needs to have a specific resistance of above 100 $\mu\Omega$/cm, a mechanical strength (Kg/cm$^2$) in the range of 100–200 Kg/cm$^2$ and a heat resistivity durable at a temperature ranging from 1,000° C. to 1,500° C. Nickel-chrome alloy, hastelloy, graphite and artificial graphite may be exemplified as materials for fulfilling the stated requirement, and among these, the artificial graphite of high purity is particularly preferred.

The cap-like pressing tip 14 of the heating member 13 has such an outer diameter as sufficient for contacting with both of the tip of the projection 7 and the inner periphery of the aperture 8. In the proximity of the tip 14 of the heating member 13, there is provided a neck 18 or a part of reduced cross section. That is, the neck 18 has a diameter which is smaller than that of the rest of the stem. The insulation layer 16 which electrically insulates the heating member 13 from the pressure applying means 10 may desirably made of a material having such a good resistivity as is durable against both heat and mechanical stress. A layer of ceramic material such as zircon or alumina is the most preferred for the layer 16, and the thickness of the coating layer may range from 0.3 mm to 0.5 mm.

Output terminals of a power source 19 is connected across the pair of the pressing members 9 and 10 in order to supply the heating member 13 with a current ranging from 3,000 A to 5,000 A to heat up the heating member to a specified high temperature within a short time period, at forming of a closed circuit by the contact of the heating member 13 with the projection 7.

In the following description, the actual process of making the intercell connection will be illustrated by way of example.

Figure 6:
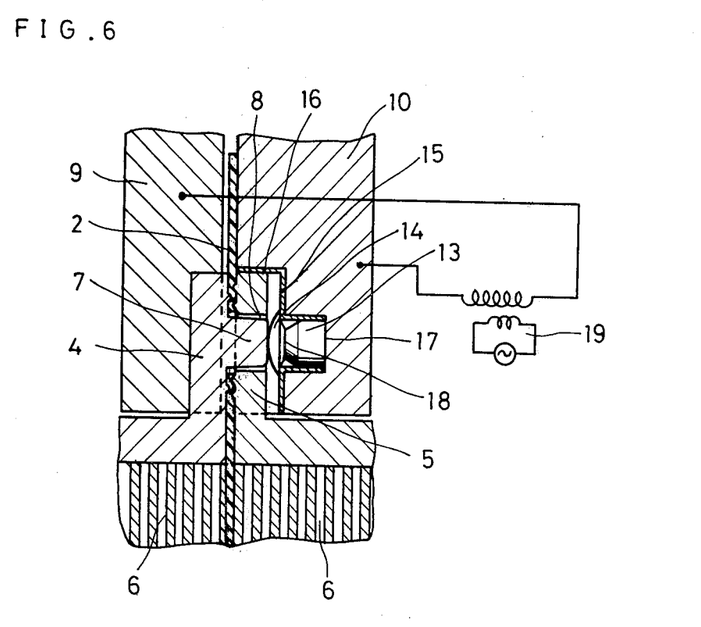
FIG. 6 is a sectional elevation view illustrating a process of another embodiment of the present invention.

Firstly, the cells 6 and 6' each having electrode assemblies are set in the unit cells and the pair of pressing members 9 and 10 are brought into a positional relationship of the respective members shown by FIG. 4. Secondly, the connectors 4 and 5 are pressed against the partition wall 2 from both sides thereof by supplying by the pressing member a suitable pressure of say 100–200 Kg/cm$^2$. With this application of pressure, an electrical closed circuit including the cap-like tip 14, being brought into contact with the tip of the projection of the connector 9, is formed as shown by FIG. 6. As a result, a current of about 3,000 A–5,000 A flows through the heating member 13 embedded in the pressing member 10. The power source 19 is controlled to supply such current for a period of a time set by a timer or the like, of about 1–2 seconds. The current flow heats up the heating member 13, which is electrically conductive to the pressing member 10 at its rear end 17, and the heating member 13 serves to heat the projection 7 to be appropriately fused.

Figure 7:
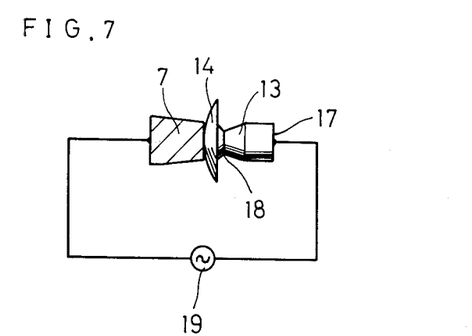
FIG. 7 is a schematic view illustrating electrical connection of the present invention.
Figure 8:
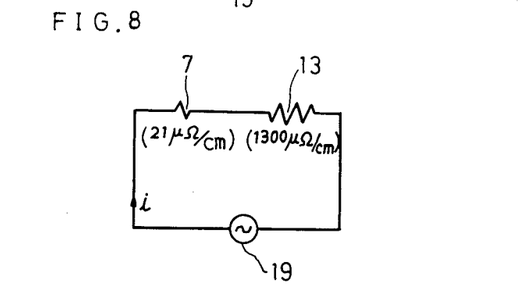
FIG. 8 is an electric circuit diagram of the connection of FIG. 7.

The current flowing condition at the contact point between the projection 7 and the heating member 13 illustrated in FIG. 7 can be interpreted in a way that the specific resistance of the projection 7 made of lead or lead alloy is 21 $\mu\Omega$/cm whereas that of the heating member 13 made of artificial graphite is 1,300 $\mu\Omega$/cm, and therefore the heating member 13 serves as a resistor of such an extremely large value as about 65 times as compared with that of the projection 7, as is obvious from the schematic circuit diagram of FIG. 8. Moreover, since the neck 18 of reduced cross section is provided in the stem of the heating member 13 in close proximity with the cap-like tip 14, the heat is produced primarily at the neck 18 where the resistance of the circuit reaches to its maximum to rise the temperature of the cap-like tip up to about 500°–900° C. instantaneously. In view of the stability, the diameter of the neck 18 should be determined to have a cross section of about two third ($\frac{2}{3}$) of that of the rest of the stem of the heating member 13. Since the resistance of the projection 7 is very small as compared with the resistance of the heating member 13, the Joule heat due to I$^2$R loss produced at the projection 7 is sufficiently small and may well be disregarded. Therefore, the welding of the projection 7 with the inner periphery of the aperture 8 is performed exclusively by the heat produced at the heating member 13 itself. FIG. 6 shows the cross section of the connection part at the middle stage when the projection 7 is not yet molten. The pressure and the heat are applied simultaneously to the tip of the projection 7 and the inner periphery of the aperture 8, thereby making the molten lead admix and fluidize and fill approximately half of the depth of aperture 8 while being heat-pressed by the tip 14 of the heating member 13.

Although this condition is created in a short period of about 2 second under the application of heat and pressure, the urging of the connector 5 by the pressing member 10 as well as the urging of the projection 7 by the heating member 13 should still continues for about 1.5–3.0 second while the temperature of the welding portion remains high enough after removal of the current, in order to make sure the solidification of the molten portion even after the current is off. The fit clearance of about 0.5–0.7 mm, between the projection 7 and the aperture 8 is needed to be maintained, because too large clearance can never be filled up with the molten lead.

Various shapes and constructions may be devised for the projection 7 as well as the aperture 8 of the respective connectors 4 and 5, though the examples of these which are considered to realize the advantageous features of the present invention most effectively are illustrated in FIG. 11.

Figure 11A:
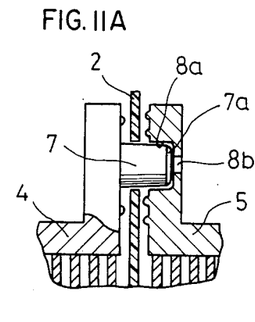
FIG. 11(A) and FIG. 11(B) are partial sectional views illustrating modified examples.
Figure 11B:
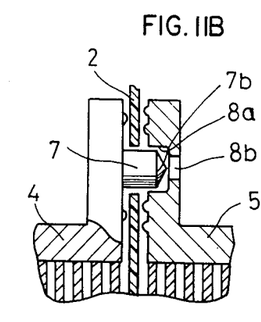
Figure 12A:
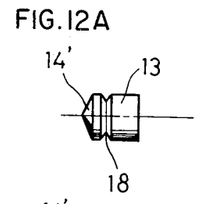
FIG. 12 illustrates several examples of heating members.
Figure 12B:
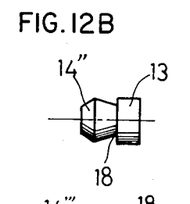
Figure 12C:
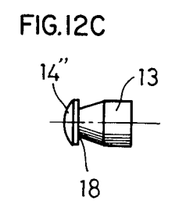
Figure 12D:
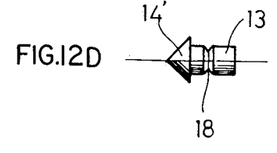
Figure 12E:
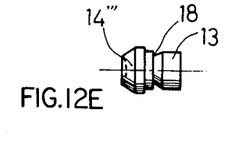

In FIG. 11(A), the tip of the projection 7 is chamferred to have a tapered surface 7a while the aperture 8 is of stepped cylindrical shape divided into a large diameter portion 8a at the partition wall side and a small diameter portion 8b concentric with the portion 8a and is extending horizontally from the portion 8a to the apart side. In FIG. 11(B), the tip of the projection 7 is modified to have a conical portion 7b. The combinations of the illustrated structural components are preferred because of its small vulnerability of inclusion of air in the welding portion because of their smallness of aperture 8b.

Figure 9:
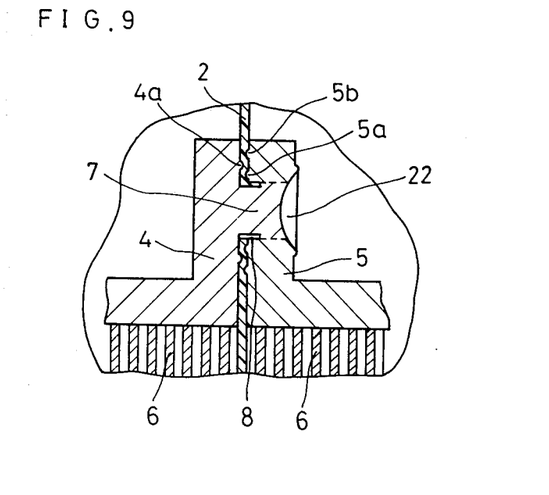
FIG. 9 is a sectional elevation view of a completed intercell connection in accordance with the present invention.

The intercell connection completed in the abovementioned way, has the construction that the projection 7 and the inner periphery of the aperture 8 are fused together thereby forming an integral body which serves to maintain the connection liquid-tight as well as gas-tight, by virtue of the provision of the annular ribs 4a, 5a and 5b, which thrust into the surface of the partition wall 2, as shown in FIG. 9. In addition to this, the method is advantageous in that; the partition wall 2 which is usually made of heat sensitive synthetic resin is substantially free from direct heating, and the lead alloy in its fluidized state does not drip off during the operation because it is under the urged condition by the cap-like tip 14 to be integrated to form an indentation 22 or concave face which corresponds to the shape of the tip 14, while the pressure is applied.

The cap-like tip 14 may be designed to have various shapes as shown in FIG. 12 wherein (A) and (D) each has a conical tip 14', (B) and (C) each has a convex tip 14" and (E) has a frusto-conical tip 14''' with a concaved face. For the length of the heating member 14 which can intrude into the plane defined by the connector 5, approximately 2–3 mm is adequate for fulfilling the stated purpose.

The shape of the tip shown by (A) or (D) is particularly suited for the case wherein the cross section of the welding spot is small while that of (B), (C) or (E) is suited for the case of large cross section.

Figure 10:
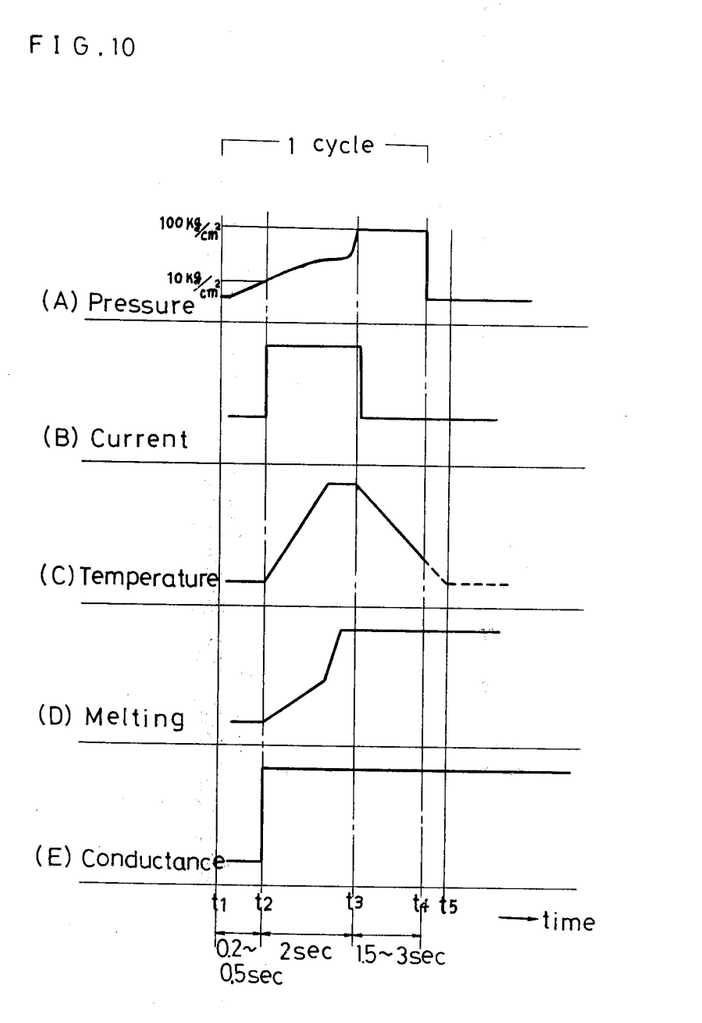
FIG. 10 is a time chart illustrating the process in accordance with the present invention.

FIG. 10 is a time chart diagram representing transitional changes in various parameters during the series of the process. The method according to the present invention begins with applying pressure and ends with removal of pressure. During the first step from $t_1$ to $t_2$ of about 0.2–0.5 second in a complete cycle for constituting the process, the positioning of the respective members in alignment and the application of pressure begin. When the applied pressure reaches to 10 $Kg/cm^2$, the current begins to be supplied. The temperature of the heating member 13 rises up by energization by the current. With this heat, the projection 7 of lead alloy begins to be softened and molten at its contact surface with the tip 14 of the heating menber 13. At the same time, the pressure given by the pressing members 9 and 10 is increased as the softening of the projection 7 advances and the temperature soon reaches its maximum thereby forming a welding joint. When the pressing members 10 moves to its limit of stroke, its pressure reaches to about 100 $Kg/cm^2$. At this stage of $t_3$ the current is removed and the cycle enters into a stage of cooling under pressure retention. After cooling down under the retention of the maximum pressure applied for about 1.5–3.0 seconds, the pressure is removed, to complete the entire cycle.

In the abovementioned example, the current is supplied for about 2 seconds of time period during which the applied pressure rises from 10 $Kg/cm^2$ to 100 $Kg/cm^2$, but an adjustment of the period in the cycle is possible with the value of the supplied current.

The above described method for making intercell connection of the present invention can establish reliable and durable connection without causing any undesirable effect or damages on the partition wall which is completely free from direct heat, because the welding and integration of the projection of one connectors with the aperture periphery of the other connector are effected entirely outside of the partition wall throughout the whole operation.

Although the inspection of the welded joint may of course be performed by unaided eyes, the confirmation of the conditions of the joint may alternatively be performed by controlling the peak width of the supplied current shown by FIG. 10(B). Satisfactory conditions have been proved to be attained by a current of, for example, 3,000 A supplied for 2 seconds.

Whether a good electrical contact is established or not, i.e., the resultant conditions of the joint is acceptable or should be rejected, can be determined by monitoring a signal which corresponds to the peak value of the supplied current and its duration by means of a level sensor which may further be combined with an automatic alarming system.

Moreover, the described method has another advantage that it provides a good fused integration of the connectors completely free from pin-holes due to remaining air, because the remaining air is forced out to be replaced by the fluidized and pressurized lead during the operation. It should be highly appreciated that the method for making intercell connection may be performed with a relatively simple equipment. Also the apparatus of the present invention may be multiplied with numbers of the pressure applying means 9 and 10 in an automated machine so as to make capable of making many connections of a storage battery simultaneously for a few seconds.

What is claimed is:

1. In a method for making an intercell connection in a multi-cell storage battery including, in each unit cell separated by at least a partition wall having an opening for said intercell connection, a pair of connectors integral with straps electrically conductive to electrode assemblies of one polarity and of the other polarity, wherein one of the connectors has a projection formed integral therewith and extending therefrom passing through said opening, and the other of the connectors has an aperture with an axis extending in the longitudinal direction of said projection to accept said projection extending through said opening, the method comprising the steps of:
   (a) positioning said one and the other connectors of neighboring unit cells in contact with opposite sides of said partition wall so that said projection passes through said opening into said aperture to form a fit joint inbetween,
   (b) causing said fit joint to be fused together by supplying said fit joint with heat sufficient for welding said projection with said aperture by applying an outside heating electrode to said fit joint with a back face of said other of the connectors being pressed by said heating electrode toward said connector and causing a heating current to flow between said projection and said heat electrode while pressing said connectors against said partition wall by a pair of pressing members, and
   (c) continuing said pressing condition for a predetermined period of time after a completion of said heating operation.

2. A method as claimed in claim 1, wherein said heating electrode is made of a heat resisting material capable of generating heat therefrom when electric current passes therethrough by the contact of it with said one of the connectors.

3. A method as claimed in claim 1, wherein said heating electrode has a cap-like tip for contacting with both the tip end of the projection and a part of the periphery of the aperture of the other of the connectors, and a neck provided in the proximity of said cap-like tip, the section of the neck being smaller than the rest of stem of said heating electrode.

4. A method as claimed in claim 1, wherein said aperture of the other connector is a straight hole having a constant internal diameter over the whole length thereof.

5. A method as claimed in claim 1, wherein said aperture of the other connector has a stepped cylindrical shape divided into a first portion having larger diameter at the side of the partition wall, for receiving said projection therein, and a second portion at the other side having a diameter smaller than that of said first portion.

6. A method as claimed in claim 1, wherein at least one annular rib concentric with said projection or aperture for thrusting into the surface of said partition wall is provided on the surfaces of said connectors opposite to the partition wall.

7. A method as claimed in claim 2, wherein said heating electrode is made of graphite or artificial graphite.

8. A method as claimed in claim 3, wherein said cap-like tip has a conical shape.

9. A method as claimed in claim 3, wherein said cap-like tip has a mushroom shape with convex top face.

10. In a method for making an intercell connection in a multi-cell storage battery including, in each unit cell separated by at least a partition wall having an opening for said intercell connection, a pair of upstanding connectors integral with straps electrically conductive to electrode assemblies of opposite polarity, wherein one of said connectors has a projection formed integral therewith and extending perpendicularly therefrom passing through said opening, and the other connector has an aperture with an axis extending perpendicularly therewith to accept said projection extending through said opening, the method comprising the steps of:
- (a) positioning said connectors of neighboring unit cells on opposite sides of said partition in contact with opposite sides of said partition wall so that said projection passes through said opening into said aperture to form a fit joint in between,
- (b) pressing said connectors against said partition wall by a pair of pressure applying means from both sides,
- (c) causing said fit joint to be fused for a given period of time to melt themselves together by urging a heating electrode against the back face of the other of said connectors and causing a heating current to be fed between said projection and said heating electrode while pressing said connectors against said partition wall by a pair of pressing members, and
- (d) continuing said pressing condition for a predetermined period of time after a completion of said heating operation.

11. A method as claimed in claim 10, wherein the pressure exerted by said pair of pressure-applying means ranges from 10 Kg/cm$^2$ to 100 Kg/cm$^2$.

12. A method as claimed in claim 10, wherein the temperature of the heating electrode rises as high as 500° C.–900° C.

13. A method as claimed in claim 10, wherein said heat generating by the heating electrode begins at a time when the pressure exerted by said pair of pressing member reaches to 10 Kg/cm$^2$ and stops at a time when the pressure rises as high as 100 Kg/cm$^2$.

14. A method as claimed in claim 1 or 9, wherein said aperture is a through-hole, thereby exposing end tip of said projection therethrough, and said heating electrode presses said end tip, thereby forming a current path connecting said heating electrode and said end tip of the projection.

* * * * *